United States Patent
Hayami (10) Patent No.: US 8,493,604 B2
(45) Date of Patent: Jul. 23, 2013

(54) INFORMATION PROCESSING APPARATUS AND CONTROL METHOD THEREOF

(75) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 13/230,577

(22) Filed: Sep. 12, 2011

(65) Prior Publication Data

US 2012/0092708 A1    Apr. 19, 2012

(30) Foreign Application Priority Data

Oct. 13, 2010   (JP) .................. 2010-230699

(51) Int. Cl.
*G06F 3/12* (2006.01)
*G06F 15/00* (2006.01)
*G06K 15/00* (2006.01)

(52) U.S. Cl.
USPC ........... 358/1.15; 358/1.16; 358/1.9; 718/102

(58) Field of Classification Search
None
See application file for complete search history.

(56) References Cited

U.S. PATENT DOCUMENTS

| 7,130,068 | B1 * | 10/2006 | Ohta .......................... 358/1.15 |
| 2007/0240159 | A1 * | 10/2007 | Sugiyama .................. 718/102 |
| 2008/0030781 | A1 * | 2/2008 | Iwase et al. ................ 358/1.16 |
| 2011/0162080 | A1 | 6/2011 | Hayami |

FOREIGN PATENT DOCUMENTS

| JP | 2003-50781 | 2/2003 |
| JP | 2007-42098 | 2/2007 |

* cited by examiner

*Primary Examiner* — Satwant Singh
(74) *Attorney, Agent, or Firm* — Fitzpatrick, Cella, Harper & Scinto (57) ABSTRACT

When execution of a job requiring user authentication included in an application program is reserved, a job identifier of the job and stored user identification information are linked to each other and registered. Then, upon execution of the reserved job, the user identification information linked to the registered job identifier is referred to, and authentication is performed as to whether or not the job is executed. When the authentication is successful, the job is executed. Further, it is determined whether or not an unexecuted job exists among registered reserved jobs. When it is determined that an unexecuted job exists, control is performed so as to maintain the linkage between the identifier of the registered unexecuted job and the stored user identification information.

7 Claims, 9 Drawing Sheets

| LOG-IN CONTEXT | CREDENTIAL |
|---|---|
| LOG-IN CONTEXT_A | CREDENTIAL_A |
|  | CREDENTIAL_B |
| LOG-IN CONTEXT_B | CREDENTIAL_C |
|  | CREDENTIAL_D |

| LOG-IN CONTEXT | CREDENTIAL | RESERVED JOB IDENTIFIER | REFERENCE COUNTER |
|---|---|---|---|
| LOG-IN CONTEXT_A | CREDENTIAL_A | JOB_B, JOB_C | 2 |
| | CREDENTIAL_B | | 0 |
| LOG-IN CONTEXT_B | CREDENTIAL_C | | 0 |
| | CREDENTIAL_D | | 0 |

FIG. 6B

| LOG-IN CONTEXT | CREDENTIAL | RESERVED JOB IDENTIFIER | REFERENCE COUNTER |
|---|---|---|---|
| LOG-IN CONTEXT_A | CREDENTIAL_A | JOB_B, JOB_C | 2 |
| | CREDENTIAL_B | | 0 |
| LOG-IN CONTEXT_B | CREDENTIAL_C | | 0 |
| | CREDENTIAL_D | | 0 |

FIG. 9

INFORMATION PROCESSING APPARATUS AND CONTROL METHOD THEREOF

BACKGROUND OF THE INVENTION

1. Field of the Invention

The present invention relates to a technique of reserving execution of a job requiring authentication included in an application program and executing the job.

2. Description of the Related Art

An image processing apparatus such as a printer, a copier, a scanner or a facsimile machine has various functions and abilities for adjustment for a particular purpose or combination of purposes. The image processing apparatus having such functions is generally a multi function peripheral (MFP) having a combination of two or more functions of conventionally separate apparatuses. The MFP may have an arbitrary number of functions. Generally, the MFP has functions of a printer, an image reader, a copier and a facsimile machine.

Further, among image processing apparatuses of this type, some apparatus have a computing resource for data storage and processing (for example, a processor, a hard disk drive, a memory and other devices). Then, as more complicated image processing apparatus and MFP, an apparatus having a network connection function for communication with e.g. another computing device (for example, a personal computer, another image processing apparatus, a network server or another device). This connection function enables the image processing apparatus to use an external resource (another computing device) available on the connected network.

Further, these image processing apparatuses have an input panel with plural buttons, knobs and other user input mechanisms. Further, some image processing apparatuses have a display panel. This display panel may be used only for display, or may be used for a user's direct input on the display. An apparatus having a touch panel or an apparatus having hardware key buttons in addition to the display panel can display menu data for user's selection input. The function corresponding to the menu data is performed by a server module generally installed in the image processing apparatus.

Further, in these image processing apparatuses, authentication processing is required in accordance with the application program. The problem is that, even when plural application programs to use the same authentication information exist, it is necessary to input authentication information in respective use of the application programs. To solve the problem, Single sign-on (SSO) is known.

For example, Japanese Patent Laid-Open No. 2003-50781 discloses a system having an authentication database to store authentication information including information for personal authentication based on an inputted ID number and a password. In this system, a client PC requests authentication information from the authentication database, then obtains the authentication information and temporarily stores the information on the client PC. Then the client PC starts an arbitrary application program based on the temporarily-stored authentication information by its authentication core.

Further, a method for realizing Single sign-on in the image processing apparatus by volatile shared authentication information (credential) management system as follows is known.

Figure 1:
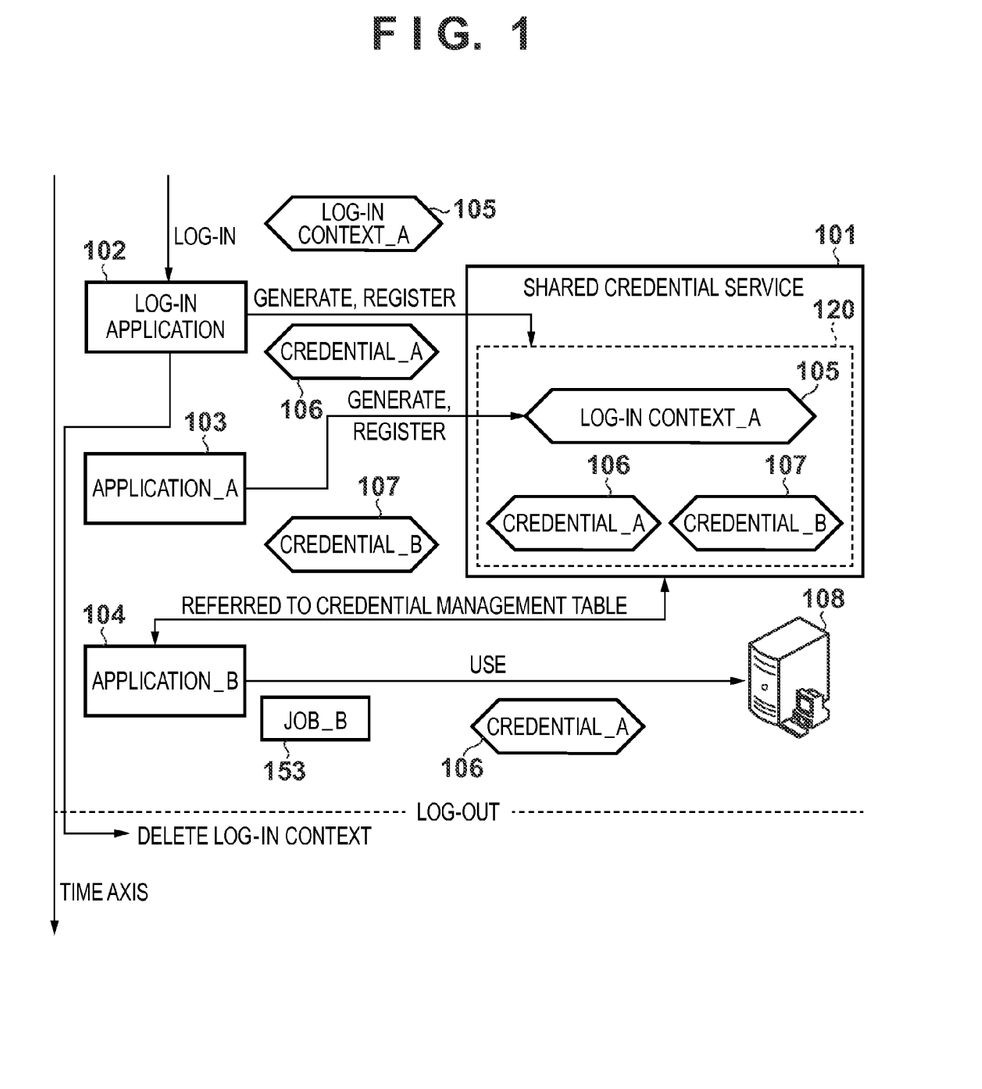
FIG. 1 is a block diagram for describing general authentication information management method.

FIG. 1 is a block diagram for explanation of general authentication information management method. In this example, for the sake of convenience of explanation, as the time axis, time elapses in a top-to-bottom direction in FIG. 1.

A shared credential service 101 for volatile credential management is registered as one of services of the image processing apparatus. Upon log-in time, a log-in application (log-in service) 102 generates a log-in context_A 105 from log-in information. The log-in context_A 105 is an interface provided with the log-in application 102 so as to obtain user information for authentication. The log-in application 102 generates a credential_A 106 and registers the credential_A 106 in the shared credential service 101. At this time, the shared credential service 101 manages this credential with the log-in context_A 105 as a key. Similarly, an application_A 103 can register a credential_B 107 with respect to the shared credential service 101. As a result, as denoted by numeral 120, the shared credential service 101 links the plural credentials_A 106 and B 107 to the user's log-in context_A 105 and manages the plural credentials_A 106 and B 107.

Figure 2:
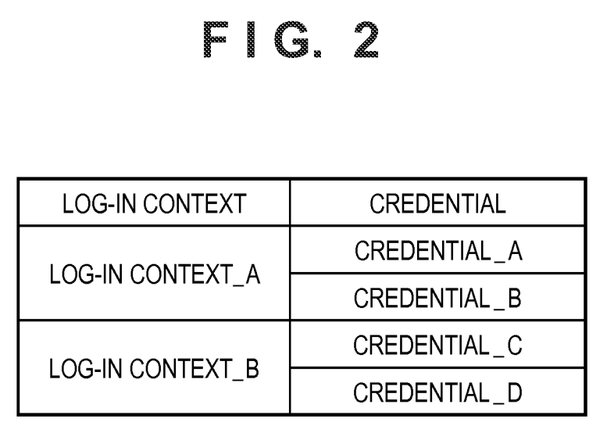
FIG. 2 depicts a view illustrating an example of a credential management table.

FIG. 2 depicts a view illustrating an example of a credential management table at this time. In this example, the credentials_A 106 and B 107 linked to the log-in context_A 105 and the credentials_C and D linked to the log-in context_B are managed. Note that in FIG. 1, only the status where the credentials_A 106 and B 107 are linked to the log-in context_A 105 is shown.

On the other hand, an example where a job_B 153 is executed by an application_B 104 to re-use the credential_A 106 obtained by the shared credential service 101 will be described. In this case, the job_B 153, to access a PC 108 using the credential_A 106, is enabled to obtain or refer to the credential_A 106 from the credential management table in FIG. 2, with designation of the log-in context_A 105 as a key with respect to the shared credential service 101. Thus the job_B 153 accesses the PC 108 using the credential_A 106. Further, thereafter, upon execution of log-out, the log-in context_A 105 is deleted. Further, the shared credential service 101 can release all the registered credential information (credential_A 106 and credential_B 107) linked to the log-in context_A 105 and under the volatile management.

Such a Single sign-on system has the following problems.

In the above-described image processing apparatus, when a user has logged in and reserved a job, there is a possibility that the job is executed after log-out of the user. At this time, as described above, when a credential is managed with a log-in context_A as a key, the log-in context is deleted upon log-out. Then, as the registration of the credential is also released in accordance with the deletion, the job referring to the credential cannot be executed.

Accordingly, in the conventional technique, when transmission of image data obtained by image scanning is reserved, a user name and a password are inputted upon reservation of the transmission, and this function is realized based on the inputted user name and password. In this manner, conventionally, it is necessary for each application to manage a user name and password to execute a job. Further, as each application manages authentication information, there is a security problem, and further, the load is heavy in consideration of management cost.

Accordingly, it is necessary to provide a frame work of Single sign-on authentication in consideration of the problem upon execution of a reserved job after log-out.

SUMMARY OF THE INVENTION

An aspect of the present invention is to eliminate the above-mentioned problems in the conventional technology.

The invention provides a technique for, upon execution of a job requiring authentication, referring to linkage between the registered reserved job and user identification information and performing user authentication, then, when a reserved unexecuted job exists, maintaining the linkage between the reserved job and the user identification information. With this technique, it is possible to execute the reserved unexecuted job even after log-out.

According to an aspect of the present invention, there is provided an information processing apparatus for executing an application program including a job requiring user authentication, the apparatus comprising: a reservation unit configured to reserve execution of a job requiring the user authentication included in the application program; a storage unit configured to hold user identification information necessary for the user authentication; a register unit configured to, when execution of the job is reserved by the reservation unit, link an identifier of the job to the user identification information stored in the storage unit and register the job identifier; an authentication unit configured to, upon execution of the reserved job, refer to the user identification information linked to the job identifier registered by the register unit and authenticate whether or not the job is executed; an execution unit configured to execute the job for which authentication by the authentication unit is successful; a determination unit configured to determine whether or not an unexecuted job exists among reserved jobs registered by the register unit; and a control unit configured to, when the determination unit determines that the unexecuted job exists, perform control to maintain linkage between the identifier of the unexecuted job registered in the register unit and the user identification information stored in the storage unit.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 3:
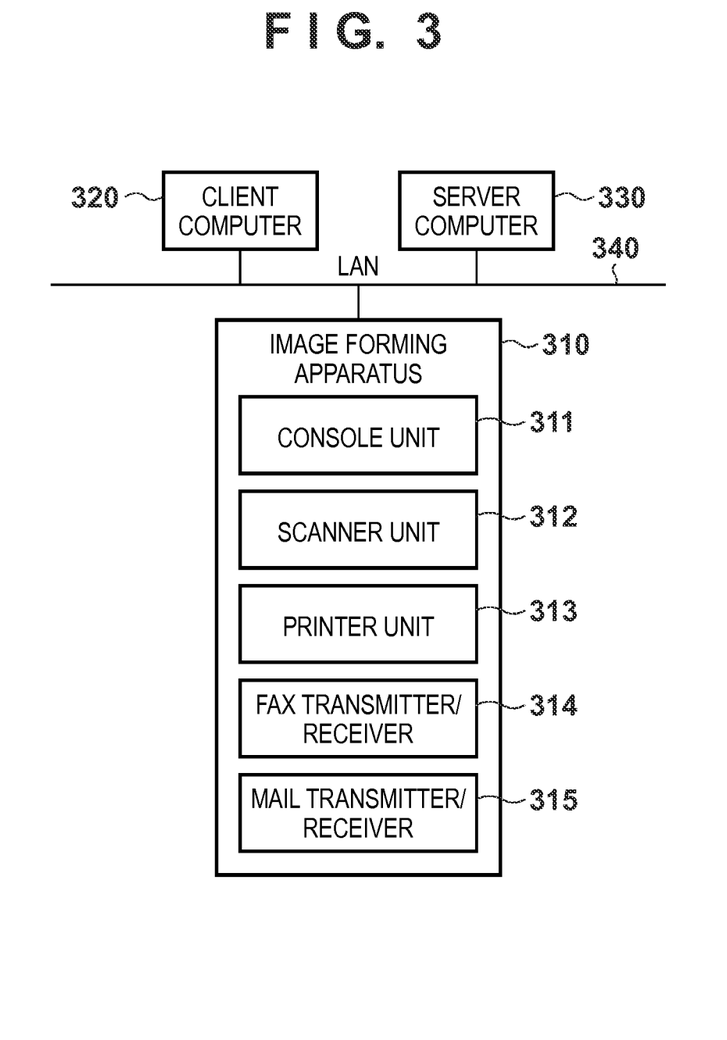
FIG. 3 is a block diagram showing the entire configuration of a print system including an image forming apparatus according to embodiments of the present invention.

FIG. 3 is a block diagram showing the entire configuration of a print system including an image forming apparatus according to embodiments of the present invention. Note that in the embodiments, a copier, a printer or a multi function peripheral having functions particularly described later will be described as an example of the image forming apparatus. However, the present invention is not limited to the image forming apparatus, but is applicable to an information processing apparatus such as a PC.

An image forming apparatus 310 is connected to, together with a client computer 320 and a server computer 330, to a LAN 340 such as Ethernet (registered trademark). Note that in this print system, the number of devices connected to the system is not limited to this number. The image forming apparatus 310 has a console unit 311, a scanner unit 312, a printer unit 313, a FAX transmitter/receiver 314, and a mail transmitter/receiver 315.

The server computer 330 having a CPU executes an operating system (OS) and various application programs, to perform various data processing by executing the application under the management of the OS. The client computer 320 operates similarly to the server computer 330.

Figure 4:
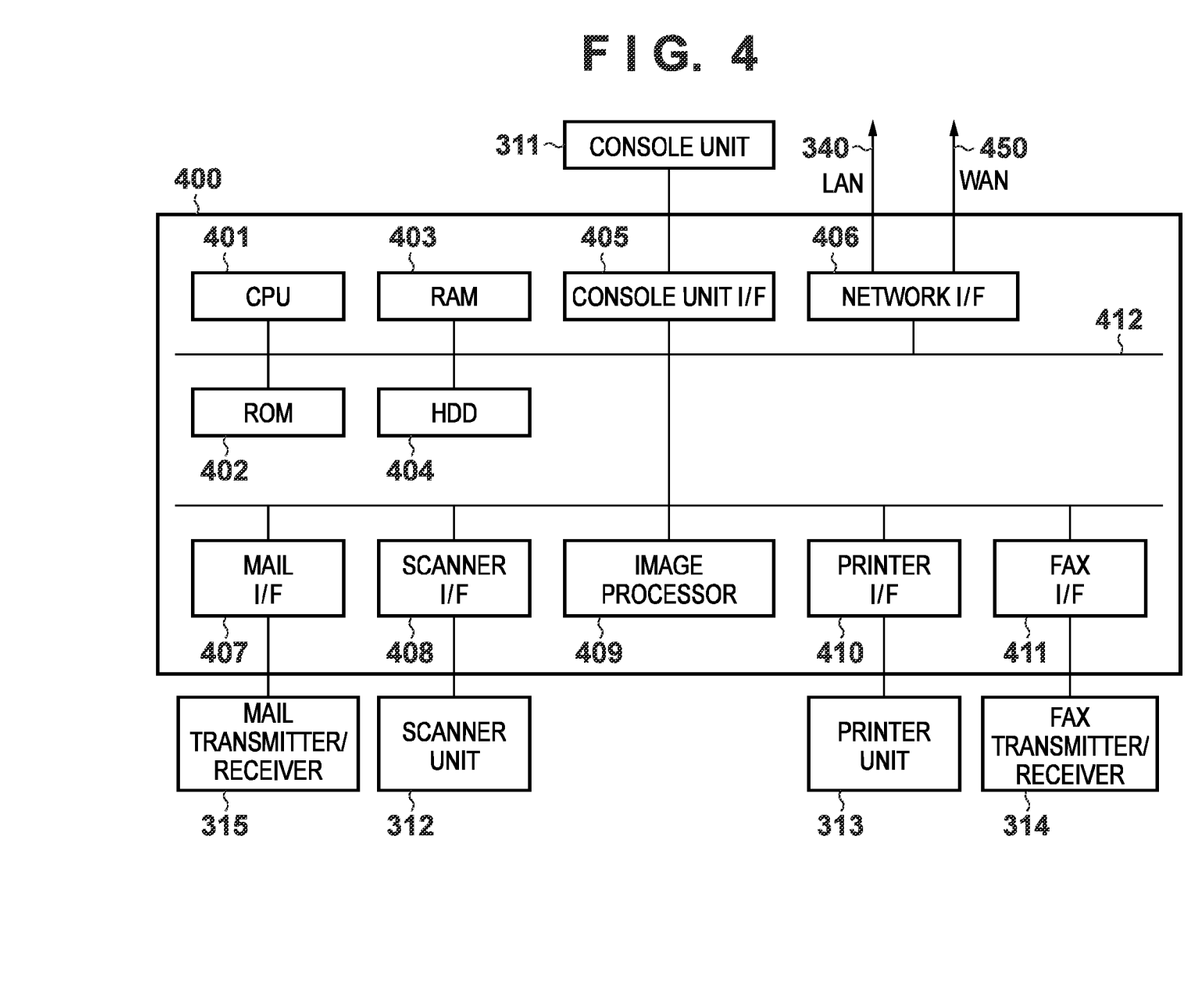
FIG. 4 is a block diagram showing a configuration of a controller to control the image forming apparatus according to the embodiments.

FIG. 4 is a block diagram showing a configuration of a controller 400 to control the image forming apparatus 310 according to the embodiments.

The image forming apparatus 310 having a copier function, a facsimile function, an electronic mail transmission function and the like, further has a data transmission function of reading an original and transmitting image data obtained by reading to the respective units of the LAN 340. The image forming apparatus 310 receives image data read with the scanner unit 312 or data designated from a computer connected to the LAN 340, and stores the image data in a particular region of the hard disk drive 404 of the image forming apparatus 310. Further, the image forming apparatus 310 can read an original and stores read data as digital image data on the hard disk drive 404. Further, the image forming apparatus 310 can print-output digital image data stored in a hard disk region.

The scanner unit 312 converts image information into an electric signal by inputting reflected light, obtained by expose-scanning on the image of the original, into a CCD. Further, the scanner unit 312 converts the electric signal into a luminance signal in respective R, G and B colors, and outputs the luminance signal as image data to the controller 400. Note that the original is set on a document feeder. When the user instructs from the console unit 311 to start reading, an original reading instruction is given from the controller 400 to the scanner unit 312. The scanner unit 312 receives the instruction, then feeds the originals from an original feeder one by one, and performs original reading. Note that the original reading method may be, not automatic feeding with an original feeder but original scanning by moving an exposure member on an original placed on a glass surface (not shown). The printer unit 313 is an image forming device to form (print) an image based on the image data received from the controller 400 on a print sheet.

The controller 400, electrically connected to the scanner unit 312 and the printer unit 313, is also connected via the LAN 340 to the client computer 320 and the server computer 330. This connection enables input/output of image data and device information. The CPU 401 expands a program from the HDD 404 on the RAM 403 by a boot program stored on the ROM 402, and controls access to the connected various devices based on the program or the like. The RAM 403 further provides a work memory for operation of the CPU 401, and serves as a memory for temporary storage of image data. The RAM 403 is an SRAM to hold stored contents after power-off or a DRAM in which the stored contents are deleted after the power-off. The HDD 404 is a hard disk drive holding the OS of the system, various application software programs and image data.

The console unit I/F 405 is an interface unit for connection between a system bus 412 and the console unit 311. The console unit I/F 405 receives image data to be displayed on the console unit 311 from the system bus 412 and outputs the image data to the console unit 311, and outputs information inputted from the console unit 311 to the system bus 412. A network I/F 406, connected to the LAN 340, a WAN (Wide Area Network) 450 and the system bus 412, performs information input/output.

A scanner I/F 408 performs correction, processing and editing on the image data received from the scanner unit 312. Note that the scanner I/F 408 determines whether the received image data is color data or monochrome data, or whether character original data or photo original data. Then the scanner I/F 408 outputs the result of the determination as attribute data of the image data.

The image processor 409 performs rotation, compression and decompression of image data. The printer I/F 410 receives image data outputted from the image processor 409, refers to the attribute data attached to the image data, and performs image processing on the image data. Thus image-processed image data is outputted, upon printing, to the printer unit 313 and print-outputted. A FAX I/F 411 outputs the image data outputted from the image processor 409 to the FAX transmitter/receiver 314. By this operation, the image data is facsimile-transmitted to a designated transmission destination through the LAN 340 (or the WAN 450). A mail I/F 407 outputs the image data outputted from the image processor 409 to the mail transmitter/receiver 315. The mail transmitter/receiver 315 transmits the mail to a designated destination through the LAN 340 (or the WAN 450). Further, the data received by the mail transmitter/receiver 315 or the FAX transmitter/receiver 314 is transmitted to the CPU 401 via the respective corresponding I/F, and is displayed on the display unit of the console unit 311 or print-outputted by the printer unit 313.

Note that the user instruction with respect to the image forming apparatus 310 and the presentation of information to the user may be performed via e.g. the console unit 311, otherwise, may be performed via the client computer 320 connected via the LAN 340.

First Embodiment

Figure 5:
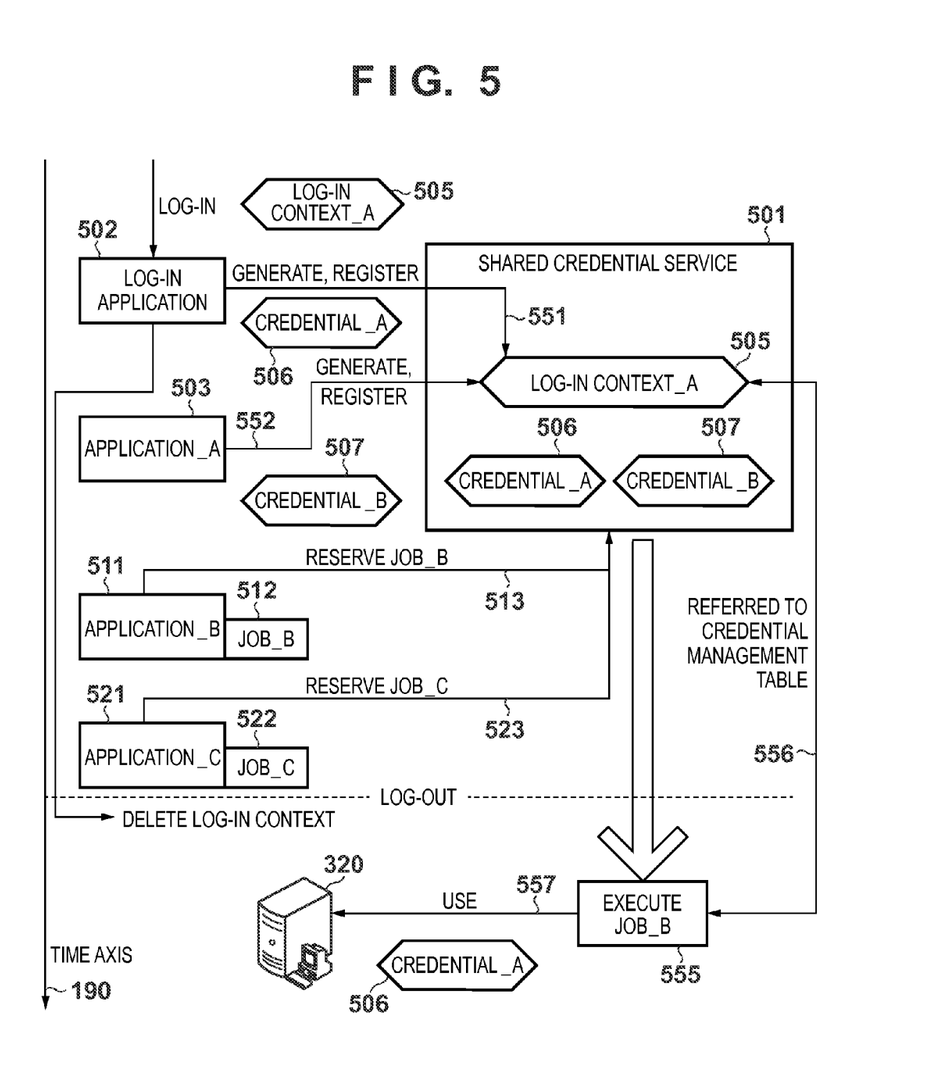
FIG. 5 is a block diagram showing a configuration upon execution of reserved job by an application utilizing a credential after log-out in the image processing apparatus according to a first embodiment of the present invention.

FIG. 5 is a block diagram showing a configuration upon execution of reserved job by an application utilizing a credential after log-out in the image processing apparatus according to a first embodiment. For the sake of convenience of explanation, a time axis 190 indicates that time flows in a top-to-bottom direction in FIG. 5.

In the present embodiment, in the image processing apparatus to execute an application including a job requiring user authentication, execution of a job requiring user authentication included in an application is reserved. Then, user identification information for the user authentication is stored as a credential.

A shared credential service 501 to manage credentials is registered as one of services of the image processing apparatus. Upon log-in denoted by numeral 550, a log-in application (log-in service) 502 generates log-in context_A 505 from log-in information. Further, the log-in application 502 generates a credential_A 506, and registers the credential_A 506 in the shared credential service 501 (551). At the same time, an application_A 503 can register a credential_B 507 in the shared credential service 501 (552).

Next, reservation of a job_B 512 by an application_B 511 to re-use the credential_A 506 in the shared credential service 501 will be described. Note that the job_B 512 is accompanied by processing to access the PC 320 utilizing the credential_A 506. Upon reservation of the job_B 512 (513), the application_B 511 inquires of the user as to whether or not the shared credential service 501 is used when the reserved job_B 512 is executed after log-out. When the user replies that the credential is used, the application_B 511 designates the log-in context_A 505 as a key with respect to the shared credential service 501. Then the application_B 511 obtains the credential_A 506 from the credential management table as shown in FIG. 2 and refers to the credential. Then the application_B 511 registers an identifier of the reserved job_B 512 with respect to the credential_A 506 in the shared credential service 501 by a method to be described later with reference to FIG. 7.

Similarly, reservation of a job_C 522 by an application_C 521 to re-use the credential_A 506 in the shared credential service 501 will be described. Upon reservation of the job_C 522 (523), the application_C 521 inquires of the user as to whether or not the shared credential service 501 is used when the reserved job_C 522 is executed after log-out. When the user replies that the shared credential service 501 is used, the application_C 521 designates the log-in context_A 505 as a key with respect to the shared credential service 501, and obtains the credential_A 506 from the credential management table and refers to the credential_A 506. The application_C 521 registers an identifier of the reserved job_C 522 with respect to the credential_A 506 in the shared credential service 501 by a method to be described later with reference to FIG. 7.

Figure 6A:
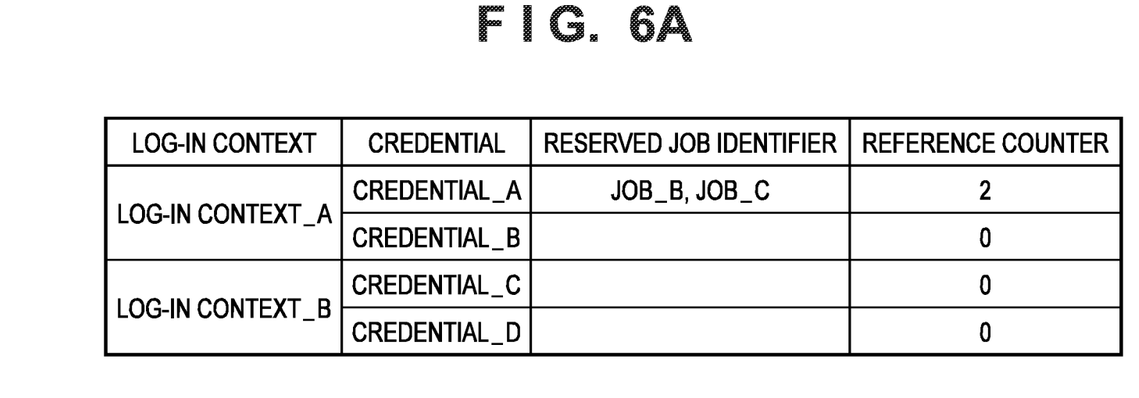
FIG. 6A depicts a view illustrating a credential management table before log-out.

FIG. 6A depicts a view illustrating an example of the credential management table.

In the table, identifiers of the reserved job_B 512 and job_C 522 are registered with respect to the credential_A 506 linked to the log-in context_A 505. When the reserved job is registered with respect to the credential, the value of a reference counter corresponding to the credential is incremented by one (+1). In FIG. 6A, as two jobs (job_B and job_C) are registered with respect to the credential_A 506 linked to the log-in context_A 505, the value of the reference counter is "2". In this manner, the reference counter functions as a counter to count the number of reserved jobs registered with linkage to user identification information (credential). When the counter value is "0", the linkage between the job and the credential is deleted upon log-out.

Next, the operation of the shared credential service 501 upon log-out will be described. Generally, upon log-out, as a log-in context is deleted, registration of the credential information linked to the log-in context is also deleted. However, a credential, regarding which an identifier of a reserved job is held in the credential management table is linked to the reserved job identifier registered in the table and the credential is held.

Figure 6B:
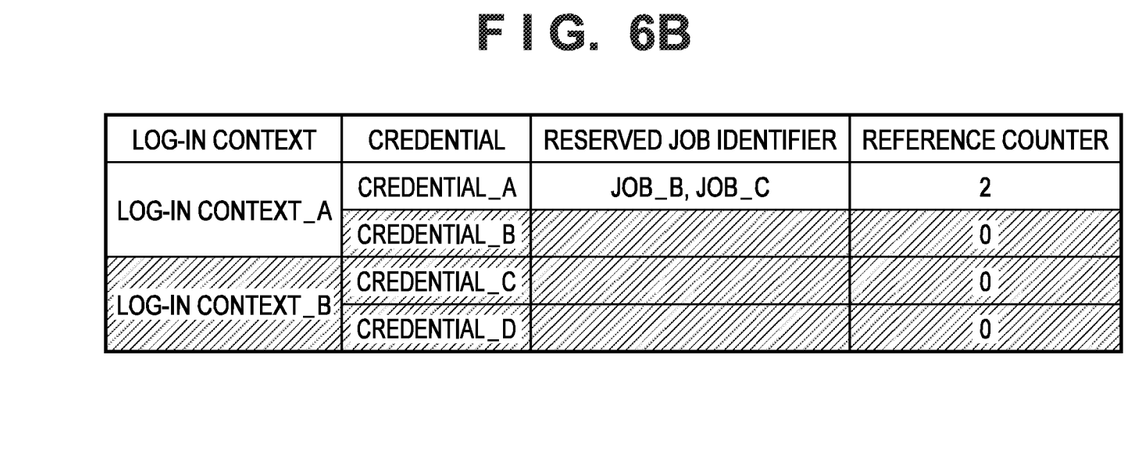
FIG. 6B depicts a view illustrating the credential management table after the log-out.

FIG. 6B depicts a view illustrating an example of the credential management table after the log-out.

In the table, credentials_C and D linked to a log-in context_B are deleted since there is no reserved job (the value of the reference counter is "0"). Similarly, a credential_B linked to the log-in context_A is deleted since there is no reserved job. In FIG. 6B, a hatched item indicates that the registration is deleted.

Next, execution of the job_B 512 after log-out will be described. Upon execution of the job_B 512 (555), in place of log-in context, the credential management table is referred to with the identifier of the reserved job as a key (556). With this operation, the credential_A 506 is retrieved. Then, it is possible to access the PC 320 using the credential_A 506 (557). When the job_B 512 has been normally executed, the application_B 511 issues a decrement instruction to decrement the value of the reference counter for the job_B 512 by one (−1) to the credential management table.

Further, after log-out, the reserved job_C 522 is normally executed by similar processing, the value of the reference counter for the credential_A 506 in the credential management table is decremented by one (−1), and the value of the reference counter is "0". Then the credential_A 506 is deleted from the shared credential service 501.

Figure 7:
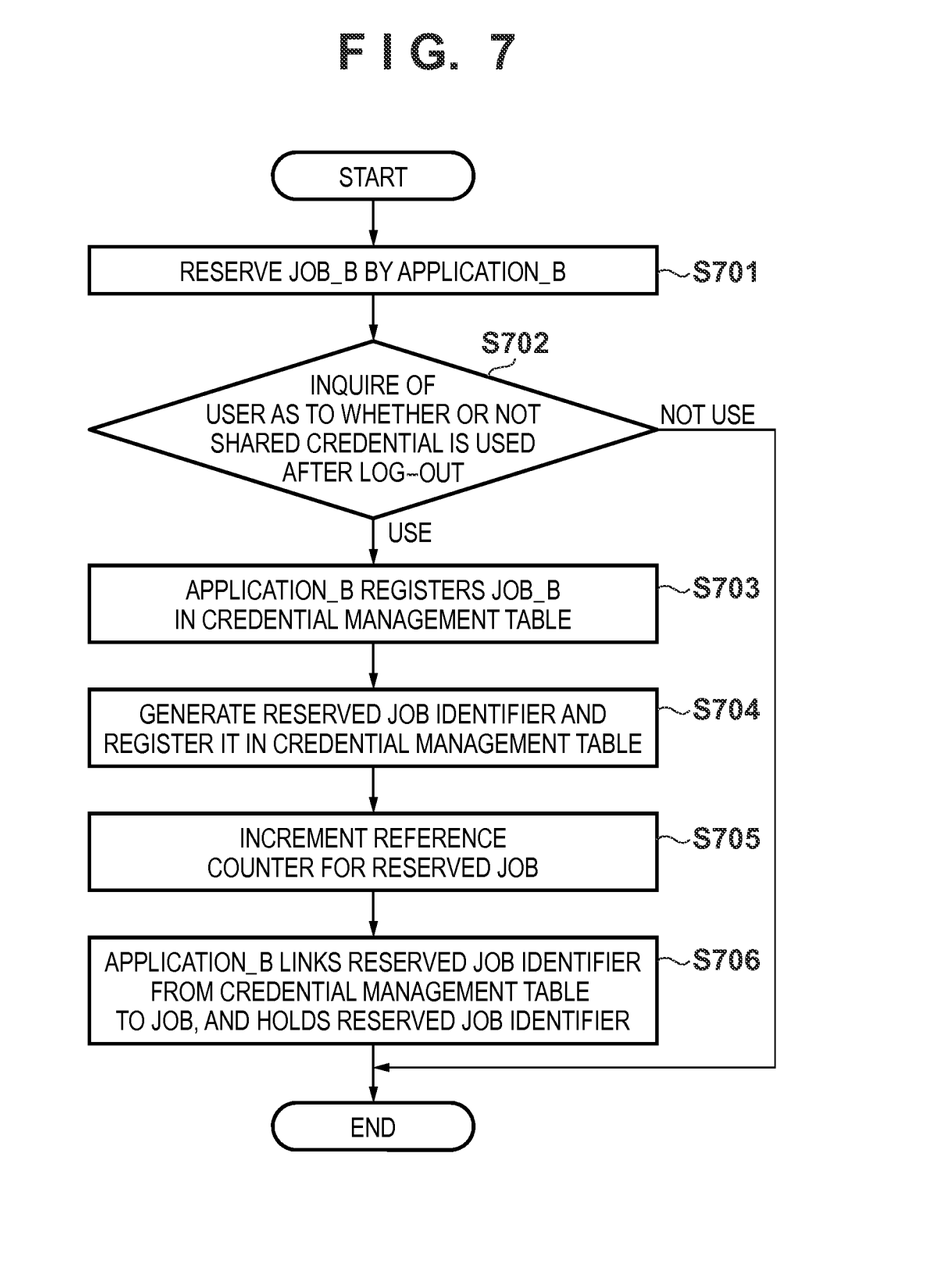
FIG. 7 is a flowchart for describing processing of registration of a credential in the credential management table upon job reservation in the image processing application according to the first embodiment.

FIG. 7 is a flowchart for describing processing of registration of a credential in the credential management table upon job reservation in the image processing apparatus in the present embodiment. Note that a program to execute this processing is installed in the HDD 404, and upon execution, the program is loaded to the RAM 403 and executed under the control of the CPU 401. Note that in this example, the application_B 511 reserves the job_B 512.

First, in step S701, reservation setting for the application_B 511 to reserve the job_B 512 is performed. Then in step S702, the application_B 511 inquires of the user as to whether or not the shared credential service 501 is used after log-out. When the user replies that the shared credential service is used, the process proceeds to step S703, otherwise, the process ends without any processing. When the user replies that the shared credential service is not used, when the job_B 512 is executed after log-out, the credential_A 506 cannot be used.

In step S703, the reserved job_B 512 is registered in the credential management table (513 in FIG. 5). Next, in step S704, at which an identifier of the reserved job is generated, and registered in a corresponding credential in the credential management table. Next, in step S705, the value of a reference counter for the corresponding credential in the credential management table is incremented by one (+1). Next, in step S706, the application 511 receives the identifier of the reserved job generated in step S704, and holds the identifier, with linkage to the job for use upon execution of the reserved job.

Note that as the identifier of the reserved job, any identifier may be used as long as it can be uniquely used for identification of the job. Note that it may be arranged such that the identifier of the reserved job is generated by generating an UUID while its uniqueness is being assured by an application itself and the ID is utilized. That is, the application_B 511 generates a unique UUID, and registers the UUID in the credential management table. Further, the linkage between the UUID and the job_B 512 is held for use upon execution of reserved job.

Figure 8:
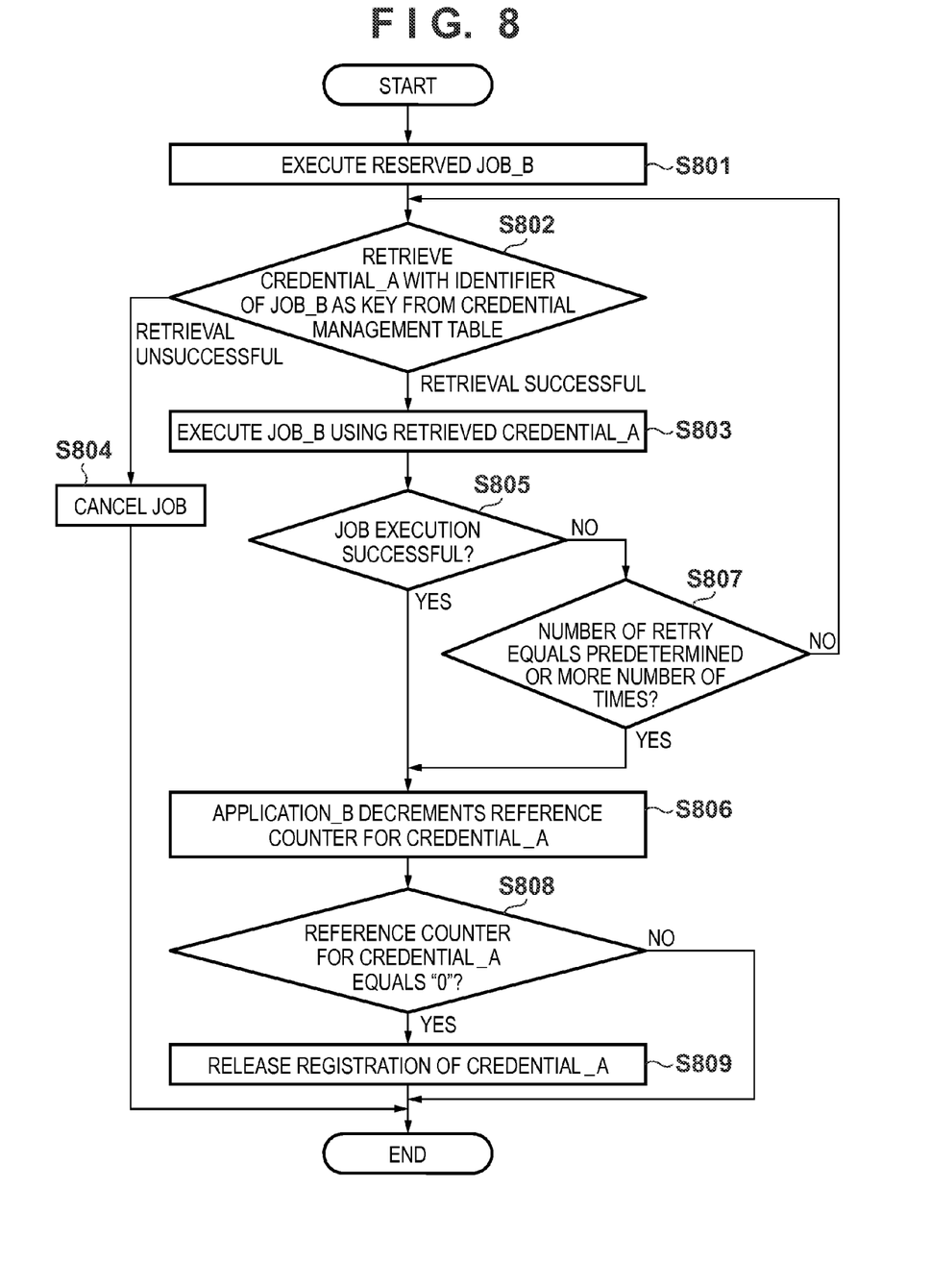
FIG. 8 is a flowchart for describing processing upon execution of a reserved job_B by an application_B 511 utilizing a credential_A 506 after log-out.

FIG. 8 is a flowchart for describing processing upon execution of a reserved job_B by an application_B 511 utilizing a credential_A 506 after log-out. Note that a program to perform this processing is installed in the HDD 404, and loaded to the RAM 403 upon execution and is executed under the control of the CPU 401.

First, in step S801, the reserved job_B 512 is executed after log-out. Next, in step S802, the application_B 511 refers to the credential management table, to retrieve the credential_A 506 with the identifier of the reserved job_B 512 as a key in step S706 in FIG. 7. When the retrieval of the credential_A 506 is successful, the process proceeds from step S802 to step S803, at which the job_B 512 is executed utilizing the credential_A 506, and the process proceeds to step S805. On the other hand, when the retrieval of the credential_A 506 in step S802 is unsuccessful, the process proceeds from step S802 to step S804, in which the job_B 512 is cancelled, and the process ends.

When the execution of the job in step S805 is successful, the process proceeds to step S806, in which the application_B 511 decrements the value of the reference counter for the credential_A 506 in the credential management table by one (−1). On the other hand, when the execution of the job in step S805 is unsuccessful, the process proceeds to step S807, in which retry is performed. In step S807, when it is determined that the number of retry is less than a predetermined value, the process proceeds to step S802, on the other hand, when it is determined that the frequency is higher than the predetermined value, the process proceeds to step S806, in which the value of the reference counter for the credential_A 506 in the credential management table is decremented by one (−1). When the value of the reference counter is decremented (−1) in step S806, then the process proceeds to step S808, in which it is determined whether or not the value of the reference counter for the credential is "0". When it is determined that the value of the reference counter for the credential is "0", as no unexecuted reserved job exists, the process proceeds to step S809, to release the registration of the credential (in this case, the credential_A). On the other hand, when it is determined in step S808 that the value of the reference counter is not "0", as an unexecuted reserved job exists, the processing is terminated in the status where the registration of the credential is maintained.

Note that in the flowchart of FIG. 8, when the execution of the job is unsuccessful, retry processing is performed, however, the present invention is not limited to this processing but is applicable to a case where the retry is not performed.

As described above, according to the first embodiment, a credential used in a reserved job, linked to the reserved job, is registered in the credential management table. Then, a counter indicating whether or not several reserved jobs are related to the credential is provided. Thus, even when log-out occurs, the credential is not deleted from the credential management table, but when the value of the counter is "0", the credential is deleted from the credential management table. In this arrangement, even upon log-out, as a reserved job and information on a credential used in the job are held, the reserved job can be executed using the credential after the log-out.

Second Embodiment

In the first embodiment, a reserved job is executed after log-out. In the second embodiment, the job reserved in the first embodiment is executed before log-out.

Figure 9:
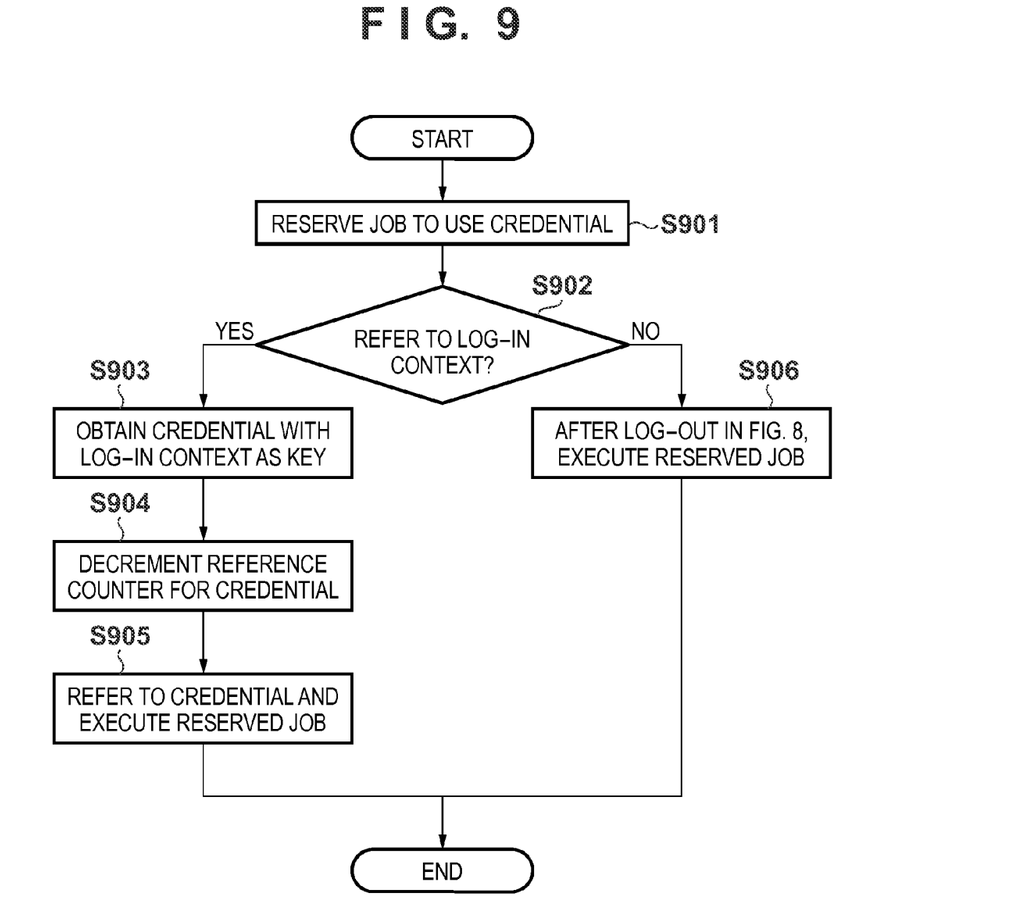
FIG. 9 is a flowchart for describing processing of execution of reservation-processed job before log-out in the image processing apparatus according to a second embodiment of the present invention.

FIG. 9 is a flowchart for describing processing of execution of reservation-processed job before log-out in the image processing apparatus according to a second embodiment of the present invention. Note that a program to perform this processing is installed in the HDD 404 and upon execution, loaded to the RAM 403 and executed under the control of the CPU 401.

First, in step S901, reservation of a job is registered by the method described in FIG. 7, and the identifier of the reserved job is registered in the credential management table as shown in FIG. 6A. Next, in step S902, it is determined whether or not an interface to obtain user information for authentication is to be used, i.e., whether or not a log-in context is referred to. When it is determined that the log-in context is not referred to, the process proceeds to step S906, in which a credential is referred to based on the identifier of the reserved job as described in the flowchart of FIG. 8.

On the other hand, when it is determined in step S902 that the log-in contest is referred to, the process proceeds to step S903, in which the credential is referred to with the log-in context_A as a key. When the reference to the credential is successful, the process proceeds to step S904, in which the value of a reference counter for the credential in the credential management table is decremented by one (−1). Then in step S905, the credential obtained from the credential management table is referred to, the reserved job is executed, and the process ends.

As described above, according to the second embodiment, even when a reserved job is executed before log-out, the value of the reference counter for the credential in the credential management table is updated. In this arrangement, when the execution of a reserved job is completed before log-out, the job is not re-executed after the log-out.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-230699, filed Oct. 13, 2010 which is hereby incorporated by reference herein in its entirety.

What is claimed is:

1. An information processing apparatus for executing an application program including a job requiring user authentication, the apparatus comprising:
a reservation unit configured to reserve execution of a job requiring the user authentication included in the application program;
a storage unit configured to hold user identification information necessary for the user authentication;
a register unit configured to, when execution of the job is reserved by the reservation unit, link an identifier of the job to the user identification information stored in the storage unit and register the job identifier;
an authentication unit configured to, upon execution of the reserved job, refer to the user identification information linked to the job identifier registered by the register unit and authenticate whether or not the job is executed;
an execution unit configured to execute the job for which authentication by the authentication unit is successful;
a determination unit configured to determine whether or not an unexecuted job exists among reserved jobs registered by the register unit; and
a control unit configured to, when the determination unit determines that the unexecuted job exists, perform control to maintain linkage between the identifier of the unexecuted job registered in the register unit and the user identification information stored in the storage unit.

2. The information processing apparatus according to claim 1, wherein the determination unit has a counting unit to count the number of the reserved jobs linked to the user identification information and registered by the register unit, and determines whether or not the unexecuted job exists in accordance with a count value of the counting unit.

3. The information processing apparatus according to claim 2, further comprising an update unit to, when the reserved job is executed by the execution unit, decrement the count value of the counting unit.

4. The information processing apparatus according to claim 2, wherein, when the count value of the counting unit is "0", the register unit releases linkage between the job identifier and the user identification information stored in the storage unit.

5. The information processing apparatus according to claim 1, further comprising an inquiry unit to, when execution of a job is reserved by the reservation unit, inquire of a user as to whether or not the job identifier and the user identification information stored in the storage unit are linked to each other and registered,
wherein, when the user replies to the inquiry by the inquiry unit that the job identifier and the user identification information are registered, the register unit links the job identifier to the user identification information stored in the storage unit and registers the linked the job identifier and the user identification information.

6. The information processing apparatus according to claim 2, wherein upon log-out, the register unit maintains linkage between the job identifier regarding which the count value of the counting unit is not "0" and the user identification information stored in the storage unit.

7. A control method of an information processing apparatus for executing an application program including a job requiring user authentication, comprising:
a reservation step of reserving execution of a job requiring the user authentication included in the application program;
a storage step of storing user identification information necessary for the user authentication into a memory;
a register step of, when execution of the job is reserved in the reservation step, linking the job identifier to the user identification information stored in the memory and registering the job identifier;
an authentication step of, upon execution of the reserved job, referring to the user identification information linked to the job identifier registered in the registering step and authenticate whether or not the job is executed;
an execution step of executing the job for which authentication in the authentication step is successful;

a determination step of determining whether or not an unexecuted job exists among reserved jobs registered in the register step; and a control step of, when it is determined in the determination step that the unexecuted job exists, performing control to maintain linkage between the identifier of the unexecuted job registered in the register step and the user identification information stored in the memory.

* * * * *